UNITED STATES PATENT OFFICE.

EDGAR CARL WALTHER ADOLF von BOYEN, OF BARMSTEDT, GERMANY, ASSIGNOR, BY MESNE ASSIGNMENTS, TO THE FIRM OF WACHS UND CEROSINWERKE ZU HAMBURG, J. SCHLICKUM & CO., OF HAMBURG, GERMANY.

PROCESS FOR REFINING AND DECOLORIZING MINERAL WAX.

1,092,629. Specification of Letters Patent. Patented Apr. 7, 1914.

No Drawing. Application filed October 15, 1910, Serial No. 587,346. Renewed March 2, 1914. Serial No. 822,073.

*To all whom it may concern:*

Be it known that I, EDGAR CARL WALTHER ADOLF VON BOYEN, a subject of the German Emperor, residing at Barmstedt, Prussia, Germany, have invented certain new and useful Improvements in Processes for Refining and Decolorizing Mineral Wax, of which the following is a specification.

The present invention relates to a process for purifying and decolorizing raw mineral wax or montan wax.

The mineral wax particularly treated according to the present invention is obtained from lignite by extraction with benzin, benzol, or other similar solvents; it is of brown-black color, and differs from ozocerite in its chemical constitution, it consisting mainly of wax and resins, and is used for purposes for which ozocerite is not applicable.

According to the present invention the raw mineral wax above described is melted by the application of heat thereto and a suitable quantity of nitric acid is added to the melted wax. During this operation the resinous substances contained in the raw wax are oxidized by combination with the oxygen of the nitric acid, and are partly precipitated in the form of a black, insoluble mass. The wax is not attacked by the nitric acid and may be separated from the precipitated oxidized resins by decantation.

In order to completely separate the resinous substances from the wax, the raw wax which has been treated with nitric acid as above described, is mixed with paraffin. For this purpose, the paraffin is added to the hot raw wax which has been treated with nitric acid. By this means the precipitation of the oxidized resins is completely effected, as the latter are totally insoluble in paraffin, and an addition, at the most, of 50% of paraffin is sufficient to entirely precipitate the oxidized resins. During this operation the precipitate of insoluble resins obtained is of reddish brown color, while the liquid mixture of mineral wax and paraffin at the top is of yellow or light orange color. The wax product so obtained may be utilized in this state for various technical purposes.

In order to purify the wax mass obtained according to the above described operations so as to obtain a perfectly colorless wax, the wax mass is treated with sulfuric acid in an amount up to about 30% and a decolorizer consisting of a mixture of a hydrous silicate and pulverized carbon. The latter substances possess the power of absorbing the color-giving substances of the wax, while the sulfuric acid carbonizes any asphalt-like constituents contained in the wax mass.

The wax which has been purified according to the above method is of course still mixed with the paraffin previously added thereto and which must be removed for the purpose of obtaining a pure wax. This can be effected by subjecting the wax mixture to a pressure of about 50 to 100 atmospheres in hydraulic hot-presses, in which the wax mass is heated to a temperature of 55°–60° C., whereby the paraffin, having a low melting point, is melted and pressed out; the operation is continued until no more paraffin can be pressed out from the wax mass. The hard wax mass being thus made free of paraffin, is melted and after being molded into a suitable form, is then ready for the market. If merely a yellow or slightly yellow wax is required, the above-described addition of paraffin may be entirely omitted, and in this case the crude mineral wax which has been treated with nitric acid is refined by means of the treatment with sulfuric acid and decolorizing powder, as above described.

I claim:—

1. Process of refining crude mineral wax obtained from lignite, which comprises first treating the crude wax with nitric acid whereby the resins contained in the mass are oxidized, mixing the wax so treated with paraffin, and separating the wax and paraffin from the precipitated oxidized resins.

2. Process of refining crude mineral wax obtained from lignite, which comprises melting the crude wax, adding nitric acid to the melted wax, whereby the resins contained in the mass are oxidized, separating the crude wax from those resins which are precipitated by the treatment with nitric acid, mixing the wax so treated with paraffin, and separating the mixture of wax and paraffin from the precipitated oxidized resins.

3. Process of refining crude mineral wax obtained from lignite, which consists in first treating the crude wax with nitric acid, whereby the resins contained in the mass are oxidized, then mixing the wax so treated with paraffin, separating the mixture of wax and paraffin from the precipitated oxidized resins, and then treating the said mixture with sulfuric acid and a decolorizing agent.

4. Process of refining crude mineral wax obtained from lignite, which consists in first treating the crude wax with nitric acid, whereby the resins contained in the mass are oxidized, separating the crude wax from those resins which are precipitated by the treatment with nitric acid, then mixing the wax so treated with paraffin, separating the mixture of wax and paraffin from the precipitated oxidized resins, then treating the said mixture with sulfuric acid and a decolorizing agent, and separating the paraffin from the wax by subjecting the mass to pressure and melting out the said paraffin.

5. Process of refining crude mineral wax obtained from lignite, which consists in first melting the crude wax, adding nitric acid to the melted wax, whereby the resins contained in the mass are oxidized, separating the crude wax from those resins which are precipitated by the treatment with nitric acid, then mixing the wax so treated with about 50% of paraffin until all of the oxidized resins are precipitated, then separating the mixture of wax and paraffin having a yellowish color from the precipitated oxidized resins, then treating the wax and paraffin with sulfuric acid and a decolorizing mixture consisting of a hydrous silicate and pulverized carbon, and then subjecting the purified mixture of wax and paraffin to high pressure and heating the same to 55°–60° C. whereby the paraffin is melted out and separated from the wax.

6. The process of refining crude mineral wax obtained from lignite, which comprises first treating the crude wax with nitric acid, separating the resulting oxidized resins, and then treating the resulting product with sulfuric acid and a deodorizing agent.

In testimony whereof I affix my signature in presence of two witnesses.

EDGAR CARL WALTHER ADOLF von BOYEN.

Witnesses:
GUSTAVE WEBER,
ERNEST H. L. MUMMENHOFF.